US006993246B1

(12) United States Patent
Pan et al.

(10) Patent No.: US 6,993,246 B1
(45) Date of Patent: Jan. 31, 2006

(54) METHOD AND SYSTEM FOR CORRELATING DATA STREAMS

(75) Inventors: Davis Pan, Arlington, MA (US); James M. Rehg, Arlington, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1344 days.

(21) Appl. No.: 09/662,474

(22) Filed: Sep. 15, 2000

(51) Int. Cl.
*H04N 5/93* (2006.01)
(52) U.S. Cl. .......................................... 386/52; 386/46
(58) Field of Classification Search ................ 386/52, 386/55, 65, 109, 111, 112, 124, 125, 126, 386/46, 45, 40, 104, 105, 106, 22, 33, 28, 386/39; 704/211, 216; H04N 5/93
See application file for complete search history.

(56) References Cited

U.S. PATENT DOCUMENTS

| | | | |
|---|---|---|---|
| 3,553,372 A | 1/1971 | Wright | |
| 4,841,387 A | 6/1989 | Rindfuss | 360/72.1 |
| 4,924,387 A | 5/1990 | Jeppesen | 364/409 |
| 5,561,457 A | 10/1996 | Cragun et al. | 348/13 |
| 5,564,005 A | 10/1996 | Weber et al. | 395/161 |
| 5,675,511 A * | 10/1997 | Prasad et al. | 715/500.1 |
| 5,737,725 A | 4/1998 | Case | 704/260 |
| 5,748,499 A | 5/1998 | Trueblood | 364/551.01 |
| 5,793,948 A | 8/1998 | Asahi et al. | 395/184.01 |
| 5,828,994 A | 10/1998 | Covell et al. | 704/211 |
| 5,835,667 A | 11/1998 | Wactlar et al. | 386/96 |
| 6,023,675 A | 2/2000 | Bennett et al. | 704/235 |
| 6,076,059 A | 6/2000 | Glickman et al. | 704/260 |
| 6,161,087 A | 12/2000 | Wightman et al. | |
| 6,181,351 B1 | 1/2001 | Merrill et al. | 345/473 |
| 6,185,329 B1 | 2/2001 | Zhang et al. | 382/176 |
| 6,205,420 B1 | 3/2001 | Takagi et al. | |
| 6,239,801 B1 * | 5/2001 | Chiu et al. | 715/500.1 |
| 6,260,011 B1 | 7/2001 | Heckerman et al. | 704/235 |
| 6,263,507 B1 | 7/2001 | Ahmad et al. | 725/134 |
| 6,505,153 B1 * | 1/2003 | Van Thong et al. | 704/211 |

OTHER PUBLICATIONS

Covell, M., et al., "MACH1: Nonuniform Time-Scale Modication of Speech," *Acoustics, Speech and Signal Processing*, 1: 349-352 (1998).

* cited by examiner

*Primary Examiner*—Robert Chevalier
(74) *Attorney, Agent, or Firm*—Richard P. Lange

(57) ABSTRACT

Events in a first data stream are correlated with events in a second data stream based on a method of indexing. As information of a first and second data stream are stored to a data file, the data streams are monitored for certain trigger events. An informational data set is generated and stored in an index file for each detected trigger event. Preferably, each informational data set includes the type of detected event, a time-stamp indicating when the event occurred and a data pointer indicating where the data associated with the event is stored in a corresponding data file. When time-stamps of detected trigger events in both data streams are generated based on a common system clock, data in one data stream is correlated with data in another data stream based on the time-stamps.

33 Claims, 5 Drawing Sheets

Fig. 2

Data sets for events in data stream #1 event = e1, data ptr = 100, time = t1 event = e2, data ptr = 300, time = t3 event = e5, data ptr = 500, time = t10 event = e3, data ptr = 700, time = t6 event = e4, data ptr = 800, time = t8 event = e6, data ptr = 1100, time = t11

Data sets for events in data stream #2 event = f1, data ptr = 500, time = t2 event = f2, data ptr = 1000, time = t4 event = f3, data ptr = 1400, time = t5 event = f4, data ptr = 1700, time = t7 event = f5, data ptr = 2200, time = t9

METHOD AND SYSTEM FOR CORRELATING DATA STREAMS

BACKGROUND OF THE INVENTION

It is often quite useful to store the contents of a data stream for later retrieval. A well-known example is streaming audio data that is stored to a recording medium for playback at a later time.

Some situations require that multiple related data streams be recorded simultaneously but in separate data files. If the data streams are related, it is often desirable that the data streams be correlated. That is, given a position or data point in the first data stream, it is often useful to know the corresponding location of related data in the second data stream.

One application potentially requiring correlated data streams involves the recording of certain audio-video data. Generally, the contents of a video data stream must be correlated to an audio data stream. When these data streams are correlated as mentioned, it is possible to playback a selected section of video data along with the corresponding audio portion of such a recording.

An example of an application that correlates streams of events is SYSLOGD, which is a UNIX utility application that logs events from multiple sources in a central file based on time-stamps. According to the principles of SYSLOGD, messages received from multiple event streams are stored with corresponding time-stamps in a central file system.

In the SYSLOGD application, storage of event records, each consisting of an event such as a received message and a corresponding time-stamp, is typically sufficient to establish a relationship between events occurring on two or more distributed computer systems. For example, a message received in one event stream can be correlated to an event in another event stream by traversing a list of time-stamps and retrieving messages having time-stamps of nearly the same time.

While event logging systems such as SYSLOGD are useful for tasks such as computer system administration, they are generally not adequate for correlating streams of data including audio or video frames.

SUMMARY OF THE INVENTION

The present invention is a novel apparatus and method generally directed towards correlating data among multiple data streams based on a use of time-stamps and related positional information. One potential application is a closed captioned system in which text is generated for display along with corresponding video data. For example, closed captions are textual transcriptions of an audio track of a television show that are displayed on a television screen at approximately the same time as corresponding video data. According to the principles of the present invention, the audio track or audio data stream can be correlated with the textual data stream to support synchronization of such streams during playback.

More particularly, one aspect of the present invention involves correlating time-sequenced data streams by identifying certain events within a first data stream and generating positional information indicating where data associated with the events are located in a corresponding storage medium such as a digital file or where the data is located within the data stream. Each detected event is preferably assigned a time-stamp reflecting a time when it was detected based on a system clock. The time-stamp serves as an index or reference in which events are correlated between related data streams. For example, events in different data streams having nearly common time-stamps indicate that such events were detected at nearly the same time and that data associated with such events are therefore related.

In one embodiment, a word processing data stream is correlated to a corresponding audio data stream. The time-stamps are potentially generated by a common system logger that time-stamps events detected in the second data stream.

Another aspect of the present invention involves correlating events in a first and second data stream based on data pointers. This involves detecting events in the first and second data stream and assigning corresponding data pointers to the detected events. These data pointers indicate where data associated with detected events are stored in the first and second data stream. Time-stamps are assigned to data pointers associated with the detected events. These time-stamps indicate a time when corresponding events were detected in a data stream. For each detected event in a data stream, a data set is maintained in an index file. Preferably, each data set includes a time-stamp indicating when an event was detected and a corresponding data pointer indicating a location where the data associated with the corresponding event is stored in the data stream or data file.

To find a corresponding event in a correlated data stream, an event in the first data stream is identified and its corresponding time-stamp is determined. The time-stamp of the event in the first data stream is then compared to time-stamps of events occurring in the second data stream. In this way, the time-stamps are used as an index to locate where the data associated with the corresponding event is stored in the second data stream. For example, a time-stamp of an event in the second data stream nearest the time-stamp of the identified event in the first stream is determined and the data pointer associated with the second time-stamp is then used to locate the event-associated data in the second data stream that correlates with event-associated data in the first data stream.

In one embodiment, time-stamps assigned to events in the first and second data stream are generated from a common system clock. Alternatively, time-stamps are generated by separately located system loggers having synchronized system clocks.

In certain applications, at least one data stream of the correlated data streams is generated or presented asynchronously. For example, in one application, the playback rate of an audio recording is varied resulting in an asynchronous data presentation. In a similar but more specific application such as the transcription of prerecorded speech, the playback rate of an audio file is optionally adjusted by a control unit that automatically changes the speed of the audio playback to match a corresponding text entry rate. The text data stream is linked to the speech in the original audio recording even though the audio recording is played back at a time-varying rate while the text was entered.

Another aspect of the present invention involves correlating more than two data streams and storing related time-stamped event data pointers to a storage device for later retrieval. As previously mentioned, the time-stamps indicate a reference time when a particular event was detected while a corresponding data pointer indicates a location where data associated with that event was stored in the data file.

Events in a data stream are optionally defined in many ways. For example, an event may be based on a passage of a predefined interval of time. Alternatively, an event is optionally defined as a random or pseudo-random event such as the occurrence of a particular word or character in a data stream.

The present invention has many advantages over the prior art. For example, it is possible to correlate data streams and events in separate data files without requiring an exhaustive search to identify related data in either of the streams. Positional information indicates a location where data associated with an event is stored in a data stream or data file, while a time-stamp indicates a time when an event was detected. Since time-stamps are generated from a common system clock, event-associated data from a first data stream are correlated with event-associated data in a second data stream based on time. A search for related data is therefore a simple task because the time-stamps serve as an easy-to-use reference index.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a table of sample events in a first and second data stream including data pointer information and corresponding time-stamps according to the principles of the present invention.

DETAILED DESCRIPTION OF THE INVENTION

A description of preferred embodiments of the invention follows.

The principles of the present invention can be used to establish a correspondence between data streams by events correlated in time. One example of a "data stream" is a sequence of video and audio frames read from a media file that can be played back through an application such as Microsoft Windows Media Player. A second example of a data stream is a series of words produced by a word processing application. When two data streams have been placed in correspondence, or correlated, each item or group of items in a first data stream is associated with an item or group of items in a second data stream.

For each data stream, a set of "events" is chosen so that the data stream can be partitioned into intervals that are meaningful with respect to the correlation task. For example, in a video player application, events can correspond to a change in the playback speed and direction, such as fast forward, reverse, play and stop. These are relevant events because they alter the speed and direction of data transmitted to a display device. In a word processing application, events can correspond to editing operations performed on a document, such as the insertion or deletion of words.

Associated with each event is a "data pointer" that indexes into the data stream at the point where the event occurs. In the video player application, the data pointer can be the frame number for a particular video frame at which there was a change in the playback rate. Likewise, in a word processing application, the data pointer can be a global index into a list of words, indicating the point at which an insertion or deletion operation occurs.

Figure 1:
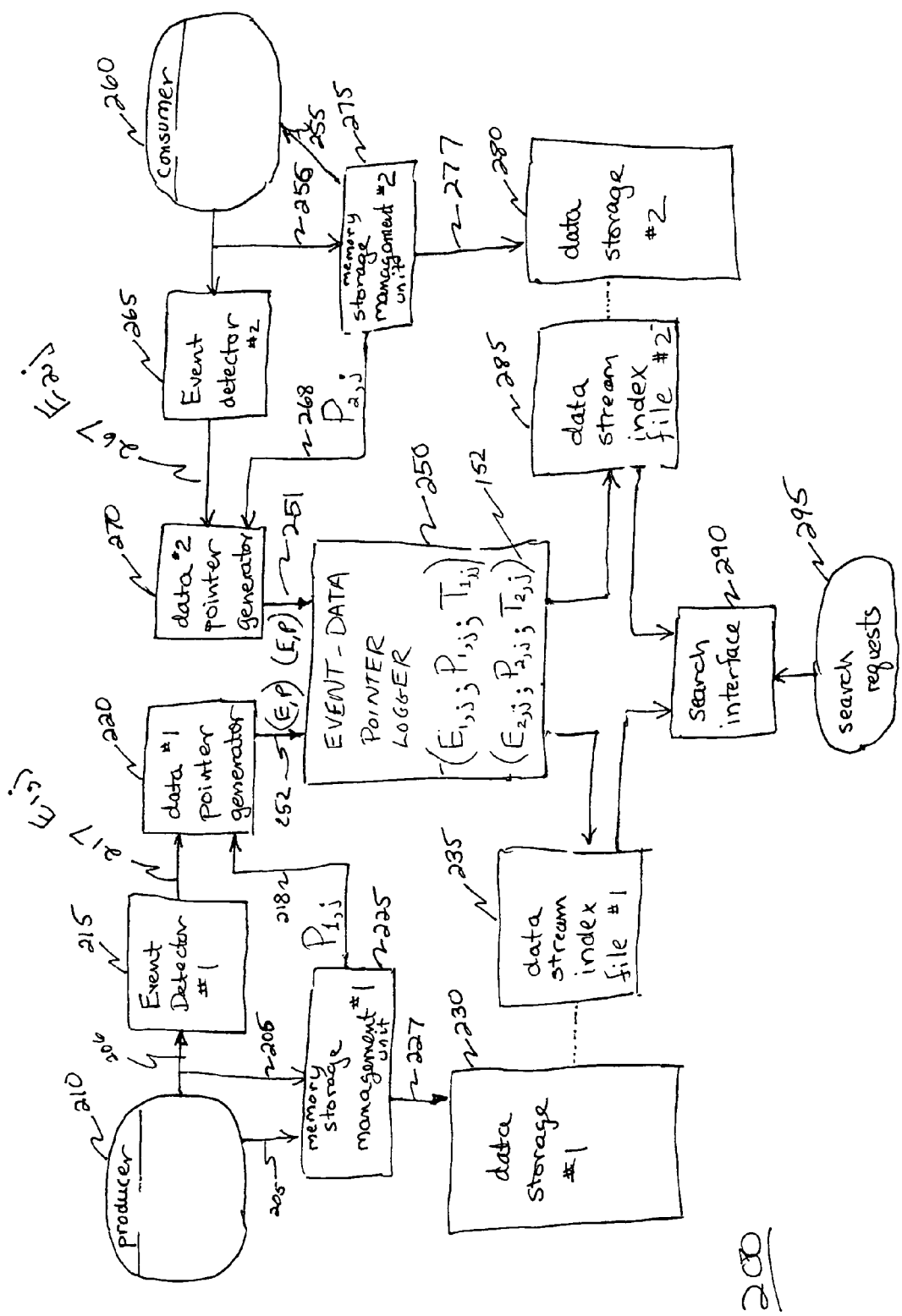
FIG. 1 is a block diagram of a recording system for correlating data streams including a search interface according to the principles of the present invention.

FIG. 1 is a block diagram illustrating various components of the present invention for automatically correlating multiple streams of data. Generally, data stream correlator system 200 supports indexing data items in a first data stream 205 to data items in a second data stream 255 using time of detection or recording as a reference. Although FIG. 1 illustrates how two data streams can be correlated, such an embodiment is optionally expanded to support correlation of more than two data streams.

More specifically, associated with first data stream 205 is an event detector module 215 and a data pointer generator module 220. The event detector 215 identifies significant events, while the data pointer generator 220 associates each event to a location in the data stream 205 or data storage 230. The output of the data pointer generator module 220 is a sequence of pairs consisting of an event, E, and an associated data pointer, P. The jth event in a sequence generated from the ith data stream is denoted $E_{i,j}$. Its associated data pointer is denoted $P_{i,j}$. The data pointer generator module 220 for the ith data stream produces a sequence of event-data pointer pairs: $(E_{i,0},P_{i,0})$, $(E_{i,1},P_{i,1})$, $(E_{i,2},P_{i,2})$, . . .

Sequences of event-data pointer pairs form the inputs to event-data pointer logger 250. The logger assigns a unique time stamp $T_{i,j}$ to each pair $(E_{i,j},P_{i,j})$. The resulting event-data pointer record 152, $(E_{i,j},P_{i,j},T_{i,j})$, is then stored in a data stream index file #1 235. There is usually one index file for each data stream.

In a similar manner, an event-data pointer record can be produced and stored in data stream index file #2 285 for second data stream 255.

Comparison between index files forms the basis for data stream correlation. Events which are in close proximity in time based on the time-stamps in the index files establish a correspondence between their associated data items. For example, two data streams can include corresponding audio and video data. By comparing time-stamps in their associated event-data pointer records, it is known which audio samples correspond to a particular video frame and vice-versa. For example, a video frame of a weather-person and temperature map will have nearly the same time-stamp as a corresponding audio segment of the weather-person discussing matters such as temperatures on the temperature map. In other words, since such events or segments were logged at nearly the same time, they will have nearly the same time-stamps associated with their stored data.

Streams of data can either be produced or consumed, depending upon the application. For example, in a media player application, streams of video and audio data are consumed by the player, which passes the video frames to a display and the audio samples to a sound system. The video and audio data may originate, for example, from a data file stored on a hard disk or from packets transmitted over a network.

In the exemplary application as shown in FIG. 1 we denote a system that produces a data stream as a "producer"

module 210 and a system that consumes a data stream as a "consumer" module 260. The embodiment of either module can be a software program, a hardware device, or some combination of both. In the media player application, the consumer is a software program. Alternatively, a producer for audio and video data streams could be a VCR or similar hardware device. A module can also be a "producer-consumer" that produces data items during certain times and consumes data items at other times.

In FIG. 1, a producer module 210 generates a first data stream 205 of information such as words in a text processing application. As data from the first data stream 205 is generated, contents of the first data stream 205 are stored in first data storage unit 230 via first storage management unit 225.

Producer module 210 also generates a first control stream 206. The control stream contains information describing attributes of the associated data stream. For example, in a text-processing application the data stream can consist of words and characters, while the control stream can specify the relative order of words in the document and whether words are being inserted, appended, or deleted.

The first memory management unit 225 utilizes the control stream to determine how to enter the data items in the data stream into the data storage unit 230. In a text-processing application, for example, the position of a word data item including information about whether it is being inserted or appended can be used to place the word in the correct position in a list of words contained in the data storage unit.

First event detector 215 analyzes the first control stream 206 and searches for specific events. An event can be defined in many ways. For example, an event can be defined as the occurrence of an insert, append, delete, or replace operation in the first control stream as a user generates textual data.

As events within the first control stream 206 are detected by first event detector 215, a sequence of events 217, $E_{1,j}$, is communicated to the first data pointer generator 220. The generator also receives positional information 218 from the first storage management unit 225 such as a data pointer, $P_{1,j}$, indicating where the data associated with the event is stored in the data storage unit 230. First data pointer generator 220 combines the event and data pointer and outputs a sequence of event-data pointer pairs 252, ($E_{1,j}$,$P_{1,j}$), to event-data pointer logger 250.

Note that in certain application of the present invention, a control stream can contain additional control information that is used by the event detector but not used by the storage management unit. In this instance, the storage management unit would ignore extraneous control information.

In situations where the event detector does not require any additional control information and the control and data streams are accessible via an interface, it is possible to apply the principles of the present invention to an existing producer or consumer module without modifying its operation.

For example, a standard commercial digital video tape player can be used in the video-audio correlation application without any modification. Such a video tape player can be interfaced to a computer using a standard IEEE 1394 (Firewire) interconnect. The player then communicates both the video and audio information and control information over the connection to indicate the current playback settings.

Event-data logger 250 receives two sequences of event-data pointer pairs, 251 and 252. A time-stamp for each event-data pointer pair is generated based on a system clock. The time-stamp reflects the time at which the pair was received by the logger and is appended to the event-data pointer pair, resulting in an event-data pointer record 152, ($E_{i,j}$,$P_{i,j}$,$T_{i,j}$).

Each event-data record includes the event $E_{i,j}$ that was detected, a data pointer $P_{i,j}$ indicating the location where the data associated with the event is stored in a corresponding memory device (or optionally a location where the event data occurred in the data stream), and a time-stamp $T_{i,j}$. The event-data pointer records 152 resulting from the first data stream are stored in a first data stream index file 235.

FIG. 1 illustrates a consumer module 260 that receives as input a second data stream 255. The consumer module generates a second control stream 256 that second storage management unit 275 uses to retrieve data items from second data storage unit 280. Note that in contrast to the first data stream 205, the second data stream 255 is produced based on data items 277 that are retrieved from data storage unit 280. Thus, a consumer module 260 reads items from pre-existing data storage while a producer module places items into storage. A producer-consumer module would exhibit both of these behaviors.

In a similar manner as described above for the first data stream 205, a second data stream index 285 is generated for events detected in a second control stream 256. Preferably, event-data pointer records 152 for the second data stream 255, ($E_{2,j}$,$P_{2,j}$,$T_{2,j}$), are stored in second data stream index file 285. It should be noted that data sets 152 generated for each data stream are optionally stored in a common index file rather than separate index files as shown in FIG. 1.

The embodiment of the present invention depicted in FIG. 1 involves a producer module 210 and a consumer module 260. In general, there is no requirement that producer and consumer modules occur in pairs. For example, an embodiment of the present invention can include any number of producers and consumers.

Search requests 295 submitted through search interface 290 are serviced based on stored data items and corresponding index information. A search request typically involves identifying a data pointer or event associated with one data stream and determining a corresponding data pointer or event in another related data steam. This will be discussed later in the specification.

It should be noted that the first data stream 205 and second data stream 255 can be of different types including different types of data items. In one embodiment, a data stream is generated at a known rate where the received data is sequentially stored in a data file. One application where data is generated or presented at a known rate is the playback or actual generation of a real-time audio file.

In alternate embodiments, however, data is generated or presented at a variable rate or in an asynchronous fashion unlike real-time audio data. In one situation, data items received towards the end of an asynchronous data stream correspond to data that is to be stored at the beginning or middle of a data file. For example, during an editing phase, textual data generated by a user at a keyboard can be stored any where in a corresponding word processing file even though the data is generated later in time within a data stream. In other situations, transmission of the data may be asynchronous with respect to the rate at which the data is transmitted. For example, an audio stream recorded in real-time is optionally played back at variable rates in generating a data stream. Data stream correlator 200 is versatile as it can be used to correlate these and other types of data streams.

FIG. 2 is a table of event data sets 152 for a first and second data stream according to the principles of correlating data as described for FIG. 1. As mentioned, certain events within each of the control streams are detected and stored along with corresponding data pointers and time-stamps. Events such as $e_i$ correspond with detected events in the first control stream 206 while $f_i$ corresponds with detected events in the second control stream 256. Positional information such as data pointers reference a location in a respective data file where data associated with an event is stored while time stamps reference a point in time when an event was logged.

Figure 3:
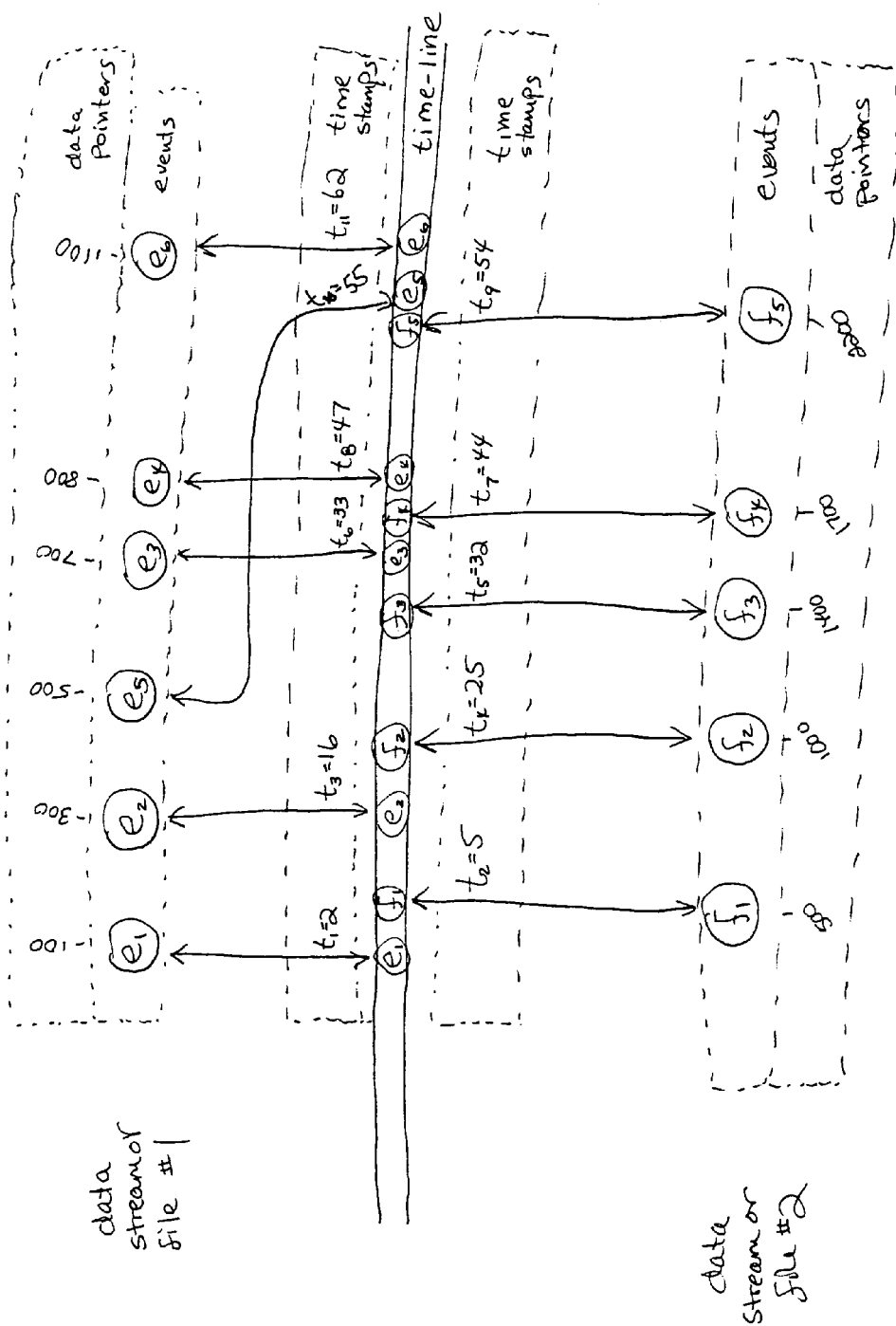
FIG. 3 is a graph illustrating sample events as defined in FIG. 2 according to the principles of the present invention.

FIG. 3 is a graph of sample trigger events as recorded over time according to sample data in the table of FIG. 2. According to the principles of the present invention, events in one data file are indexed to events in a second data file based on time-stamps and corresponding data pointers.

Consider event $e_3$ in the first data file. To determine a corresponding event in the second data file associated with $e_3$, the event data set 152 associated with the event is first located. It is known from such data that the corresponding time-stamp for $e_3$ is $t_6=33$. This time-stamp serves as an index into time-line of FIG. 3.

In the course of determining a corresponding event in a second data stream, time-stamps associated with events in the second data file are compared with time-stamp $t_6=33$. There are two events in second data file that have nearly the same time-stamps as our trigger event $e_3$ in the first data stream: $t_5=32$ or $t_7=44$. It is known based on closer proximity in time that the event in second data file related to $t_5=32$ is the closest matching event in the second data stream. That is, 32 is closer to 33 than 44. Consequently, event $e_3$ in the first data file corresponds with event $f_3$ in the second data file. Location of event $f_3$ is determined using data pointer associated with time-stamp $t_5$.

In a similar manner, events from second data stream 255 incorporated in second data file are indexed to events within first data stream 205 stored in the first data file. For example, consider event $f_5$ in second data file and related time-stamp data $t_9=54$. Time-stamps in event data sets 152 of the first data file are compared to the time-stamp $t_9=54$. Based on corresponding time-stamps, it is known that the two events closest to $f_5$ in the first data stream or file are $e_4$ and $e_5$. That is, event $e_4$ has a time stamp of $t_8=47$ which is prior to time-stamp $t_9=54$ corresponding to $f_5$. Event $e_5$ in the first data file has a time-stamp of $t_{10}=55$, which was recorded after but at nearly the same time as event $f_5$. Hence, event $e_5$ in the first data file corresponds with event $f_5$ in second data file.

Other cause-effect correlation options are also possible. For example, it is possible to link to the data pointer with the closest time stamp occurring before a given time stamp, or link the data pointer with the closest time stamp occurring after a given time stamp.

It should be noted that the recorded data file and associated index information can be processed in different ways to locate an event in a data stream or corresponding data file. For example, given a particular system clock time, the event data sets 152 are optionally searched to determine a closest time-stamped data set. Based on a corresponding data pointer of a nearest time-stamped data set 152, the whereabouts of a corresponding event in a related data stream can be determined.

Alternatively, given a position in the data stream or data file, a corresponding location in a correlated data stream can be determined by first identifying the closest data pointer in the index of the corresponding data stream. Thereafter, the information in the event data set 152 corresponding location is determined by comparing time-stamps.

This unique method of correlating data streams is advantageous over other methods. For example, according to the principles of the present invention, events are correlated with each other based on time-stamps indicating when an event was detected in a data stream and data pointers indicating a location in memory where an event is stored in the data file. It is often difficult to locate events stored in a data file when positional information such as data pointers are not maintained for tracking corresponding events.

Consider a case where only events transmitted to the logger 250 are time-stamped. In many applications, given a particular event, it is difficult to locate a corresponding data item because the time-stamp associated with an event may not linearly correspond to a position of the data item in the data file or data stream. That is, data from a data stream may not be received in a continuous linear manner over time. Rather, intermittent events within a data stream may be sporadically received and thereafter stored to a data file. This typically renders it a formidable task to locate a data item in a data stream or data file because a whole file must be searched to find a particular data item.

Application to On-Line Note-Taking

In one embodiment, the first data stream 205 is text data generated by a user in response to an audio-visual presentation. It is desirable to correlate a series of notes taken during the course of a lecture with an audio-visual recording of the lecture. This can be accomplished using the principles of the present invention.

For example, the first data stream 205 is optionally text-based data generated by a user at a keyboard. The second data stream 255 is audio data corresponding to the lecturer's presentation. It is generated by a second producer module that represents the microphone system in the lecture hall. Note that in this instance of the present invention, there are two producer modules generating streams of data in real-time. The audio and text-based data stream can be correlated via data stream correlator system 200 as previously described except consumer module 260 is now a producer module also.

An example of events for a text-based data stream are "append," "insert," and "delete." "Append" events are generated when a word is added at the end of a document, while "insert" events are generated when a user inserts a word into the document near previously typed text. Finally, "delete" events are generated when a word is deleted from a document.

As mentioned, when events are detected, a data pointer is generated indicating a position of the associated word within the corresponding data stream or document file where it is recorded. This process of creating data sets is advantageous because an index of information for correlating data streams is generated as data of a respective data stream is being stored to a data file. Hence, data items in one stream are correlated with data items in another stream while data in each stream is received and stored to memory.

Data pointer values do not necessarily have to be actual physical addresses, instead these values can be arbitrarily specified, but linked to physical addresses via a lookup table or address map.

In one application, values of the data pointers are spaced to accommodate insertions into previously entered text. Consider records including an event and corresponding data pointer indicating an index into a document file specifying where a word is stored in a document. That is, in a record such as (append, 300,25), "append" is the type of event detected and "300" is the index where the appended word is stored. The number "25" of the sample data set is a timestamp indicating when the append event was logged based on a reference clock. For example, the append event occurred at time marker 25.

If a sequence of events/data pointer pairs is (append,300, 25), (append,400,30), and (append,500,40), an event such as "insert" can be appropriately added at a later time. For instance, an "insert" event such as (insert,350,50) can be added to a corresponding index without effecting the recorded event/data pointer pairs for already existing pairs (append,300,25) and (append, 400,30).

In the previous example, the values of data pointers are averaged to generate an appropriate new data pointer for the event corresponding to an insertion into the document. For example, the data pointer for the previously discussed "insert" event is determined by averaging 300 and 400 to produce a data pointer of 350. This technique is advantageous because data pointers for previously recorded events need not be changed when an event is inserted at a later time.

Predefined events in the second data stream 255 of our exemplary embodiment are the recording of a fixed number of audio samples. For example, an event can be generated whenever one second of new audio had been recorded. Data pointers associated with the detected event preferably identify the relative or absolute position of the audio tape when the corresponding event was detected. In one application, the data pointer is a burned-in-time-code of a tape, indicating the absolute position in the audio data stream where an event is detected.

Optional features for correlating events according to the principles of the present invention include event filtering and data pointer interpolation.

Event filtering involves consolidating events recorded for a correlated data stream. Consider the situation where an event such as "insert" or "append" is recorded based on user text input. At a later time, the word corresponding to the "append" or "insert" event may be consolidated in the index with a "delete" event, such that the "insert" and corresponding "delete" event are removed from the index. Consider a sample sequence of events such as (append,500,20), (append,600,25), (append,700,35), (delete,500,40), (insert,650, 50). After event filtering, events (append,500,20) and (delete,500,40) are consolidated and the sequence becomes: (append,600,25), (insert,650,50), (append,700,35).

Without event filtering, correlating a text data stream corresponding to the real-time creation of a document can be problematic. Any word which occurs in association with a certain time-stamped event could be removed by a later event. Event filtering consolidates these events and produces a set of records which describe the consolidated data stream.

Less processing power is required to utilize such a newly consolidated index. Additionally, less memory is required to store the index.

Data pointers in the original list can occur out-of-order with respect to a time-stamp. For example, the delete and insert events above can occur out-of-order. Following event filtering, the list can be ordered with respect to data pointer, and there will be only one event associated with any particular data pointer.

Data pointer interpolation is used to generate a regular stream of data pointers when a sparse set of events occurs in one of the control streams. For instance, consider two correlated streams of data where one stream has associated with it a sparse set of events. Without events and time-stamps in both streams, there are no events to precisely synchronize the streams of data with each other. According to this technique, events are added at regular intervals of time when there are few detected events in a particular data stream. This technique of adding events is often advantageous in situations where it is necessary to precisely synchronize related data streams.

Figure 4:
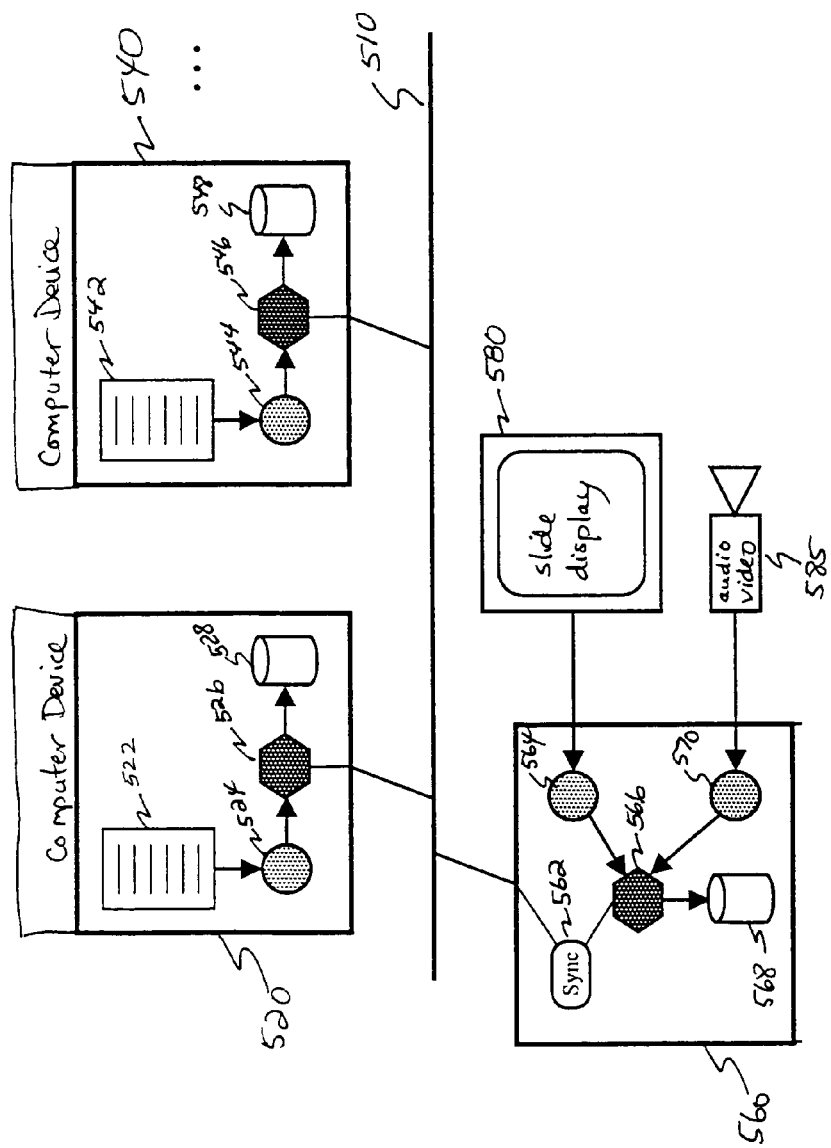
FIG. 4 is a recording system that correlates data streams from multiple sources interconnected via a communication link according to the principles of the present invention.

FIG. 4 is a block diagram of a note-taking system incorporating the principles of the present invention. Generally, multiple streams of data generated by portable computers are correlated with a corresponding audio-video data stream and slide presentation. This embodiment is particularly useful in lecture settings where students with portable computers take notes while the lecture is simultaneously recorded using video capture equipment. Following a lecture, students can compare notes taken at a particular time of the lecture based on the principles of the present invention.

A first computer 520 and second computer 540 are in communication with data processing unit 560 via communication link 510 such as a wireless or Internet connection. The first computer 520 supports a word processing application 522 enabling users such as students to take notes of a presentation such as a live lecture. A data stream and corresponding data file is created as a user at first computer 520 records notes in word processor application 522. Events within the data stream of notes generated by user are detected at event triggered data pointer generator 524, which produces a corresponding data pointer for each detected event.

As mentioned earlier, the type of events that trigger the event triggered data pointer generator 524 are predefined for a particular application. Preferably, the class of trigger events is chosen so that a reasonable number of event data sets are generated for correlating respective data streams. As mentioned, trigger events can be inputs such as insertions, deletions and appending of text-based information.

Second computer 540 provides similar functionality as that described in the first computer 520 for a second user taking notes. Notably, recording system 500 optionally supports other computers in addition to first computer 520 and second computer 540 as shown.

During a presentation of information at slide display device 580, an audio-video recording unit 585 captures details of, for example, a corresponding slide presentation including a lecturer delivering a speech. A data stream generated by the audio-video recording unit 585 is captured for storage in a data file at data processing unit 560. A stream of data generated by the audio-video recording unit 585 is monitored for events at event triggered data pointer generator 570. In a similar manner, slide display device 580 generates a stream of data that is monitored at a second event triggered data pointer generator 564 in data processing unit 560. It should be noted that different events are detected for each data stream based on a corresponding control stream.

As events are detected within a corresponding control stream, information regarding the occurrence of such events are stored in an index file by a corresponding event recording unit that generates event data sets 152. Since the time-stamp associated with each event serves as an index to correlate events in multiple streams, it is advantageous to synchronize the time-stamp generating system clocks among processing units via synchronizer 562 to assure that the time-stamps generated at different locations are based on a common clock setting. Thus, as events occur in a corresponding data stream at remotely located devices, the events will be time-stamped relative to a virtually common system clock.

Events detected at event detector 524 trigger event recording unit 526, which is a combination of Data Pointer Generator 220 and Event-Data Pointer Logger 250, to record an event data set 152 including event type, data pointer and corresponding time-stamp in memory storage unit 528. In a similar manner, events detected at event detector 544 in second computer 540 are stored in memory storage unit 548 via event recording unit 546. At data processing unit 560, events detected at event detector 564 and event detector 570 are stored in memory storage unit 568 via event recording unit 566. Again, all events and related information is stored with a corresponding time-stamp generated from respective and preferably synchronized system clocks. The index information created for each data stream such as data sets 152 can be used a at a later time to correlate data events among the data streams. For example, students attending the lecture can compare notes taken at a particular point in time according to the principles of the present invention.

Application to the Generation of Closed Captions

Another application of data stream correlator system 200 is a system that permits a human operator to create closed captions for video or audio content. Closed captions are textual transcriptions of an audio track of a television show that are displayed on a television screen at approximately the same time as corresponding video frames.

According to the principles of the present invention, the audio track or audio data stream can be correlated with the textual data stream to support synchronization of such streams during playback. The block diagram of FIG. 1 is appropriate for this application. In this case, the producer is a text-entry program that permits a human operator to type words corresponding to the audio track of a television program. The data stream 205 in this case will be a sequence of words. The associated control stream 206 would consist of a single token, called append, which will occur whenever a new word is generated.

The event detector 215 in this application can simply count the number of words that are typed and generate a new event-data pointer record every time a certain number of words has been typed. For example, a record could be created whenever there was one new word, or whenever there were 10 new words. Increasing the word count reduces the number of records in the log, thereby reducing communication bandwidth and storage requirements However, this is done at the expense of accuracy in locating individual words in a data file.

The consumer 260 in this case is a video playback system which produces a television program in real-time. This can be a standard media player program running on a computer. The data stream 255 would consist of audio samples and video frames corresponding to the television program. In the simplest embodiment of this application, the control stream 256 consists of two tokens, start and end, corresponding to the start and end of a playback.

In this case the index file 285 will contain only two event-data pointer records: (start,1,$T_0$) and (end,N,$T_{2,2}$). Here $E_{2,1}$="start" and $E_{2,2}$="end". $P_{2,1}$=N is the total number of frames in the video sequence and $T_{2,1}$=$T_0$ is the time at which the start of playback was logged.

If the playback occurs at the standard NTSC video rate of 30 frames per second, then given the starting time $T_0$ for the playback, it is possible to calculate, for each subsequent time T, the data pointer V for the video frame which appeared at that instant in time. It is given by $V(T)=\lfloor 30(T-T_0) \rfloor$, where time is measured in seconds and V is an integer corresponding to a sequential video frame number. $\lfloor x \rfloor$ denotes the floor function (x is a placeholder value) for a real number x which returns the largest integer that is less than or equal to x. For example, if x=3.5, then $\lfloor x \rfloor$=3. We call V a "virtual data pointer" since it does not appear in the index file directly but can be calculated from the contents of the index file.

Once index files 235 and 285 have been constructed for a particular television program, playback with closed caption information can be accomplished. Given the data pointer V for a video frame which is to be produced, the corresponding start and end times for that frame can be obtained by inverting the function V(T) given above. By searching for these times in index file 235, the appropriate closed caption text can be identified and displayed.

In many cases it is difficult for a typist to keep up with the dialog in a television program or movie in real-time. The dialog can be very fast and may be difficult to understand. It may be desirable to allow the typist to control the playback rate for the application, slowing down or speeding up the rate at which frames are produced. This varies depending on the difficulty of the transcription task, but is easily accomplished based the techniques of the present invention.

In order to accommodate a variable playback rate, we must expand the control stream 256 to include the desired playback rate as part of the control information. The event detector 265 generates an event whenever the playback rate changes. Event-data pointer records contained in index 285 will then have the form $(R_j,V_j,T_{2,j})$, where $R_j$ is the playback rate in effect following video frame $V_j$.

The calculation of virtual data pointers can be amended in a similar manner. For a particular time T, we can identify the kth event-data pointer record in the index 285 which has the property that $T_{2,k} \leq T < T_{2,k+1}$. We then have $V(T)=V_k+\lfloor R_k(T-T_{2,k}) \rfloor$. This example illustrates the flexibility of the present invention in dealing with data streams whose data rate varies in an unpredictable fashion.

The calculation of a virtual data pointer in the variable playback case also illustrates a potential advantage of the present invention over the prior art. For example, by including data pointers directly in the event records, we gain robustness against system latency.

Latency refers to the delay between the issuance of an event-data pointer pair by the data pointer generator and time it is processing by the event-data pointer logger 250. An event can occur at a particular time $t_j$, but the event may not be logged until time $T_j=t_j+\Delta T_j$, where $\Delta T_j$ is the latency. In this case the time-stamp in the index record 152 will not accurately reflect the time at which an event occurred.

There are many possible sources of latency. If the logger unit 250 receives a large number of event-data pointer pairs, it may not be able to process them quickly enough, particularly if the computer system is running the application is experiencing a large workload. If the pairs are being transmitted over a network, then congestion in the network is another potential source of latency. The consequences of latency depend upon the application and the desired time resolution at which queries are being made. However, a general goal is to minimize latency.

Consider a case where data pointers are not recorded for each event corresponding to a change in the playback rate. This is typically the case in straightforward event-logging systems such as SYSLOGD. In that case it is still possible to calculate a virtual data pointer. Consider the specific case where $V_1$ is 0 and calculate virtual data pointers for time instants from $T_1$ to T, where $T_3 \leq T < T_4$. Note that the stream index has been dropped for simplicity, i.e., $T_{2,j}$ is now $T_j$. Then we have $V_e(T)=R_1(T_2-T_1)+R_2(T_3-T_2)+R_3(T-T_3)$, where $V_e(T)$ is the virtual data pointer calculated using event information alone. Note that for simplicity the floor function has been omitted from the above and following computations. Substituting in the latencies, we can compute the error in the virtual data pointer in the event case:

$$\overline{V_e}(T)=V_e(T)-V_c(T)=V_e(T)-V_3-R_3(T-t_3)=R_1(\Delta T_2-\Delta T_1)+R_2(\Delta T_3-\Delta T_2)-R_3\Delta T_3$$

where $V_c(T)$ denotes the correct value for the data pointer in the absence of any latency in the system. Similarly we can compute the error in the virtual data pointer generated by the current invention:

$$\overline{V}(T)=V(T)-V_c(T)=V_3+R_3(T-t_3-\Delta T_3)-V_c(T)=-R_3\Delta T_3.$$

Note how the error in this case is only dependent on the most recent latency, $\Delta T_3$, whereas the error in the virtual data pointer for the prior art is affected by the history of latency errors, $\Delta T_1$, $\Delta T_2$, and $\Delta T_3$. This illustrates the benefit of the present invention over other systems that record events but not associated data pointers.

An alternative solution would be to eliminate latency altogether by time-stamping events before they are transmitted to the logger rather than after they arrive. This approach has a significant disadvantage, however, to the extent that it would require all of the event detection modules to have synchronized clocks. This could be difficult to achieve if the modules are executing on a distributed computer system.

Figure 5:
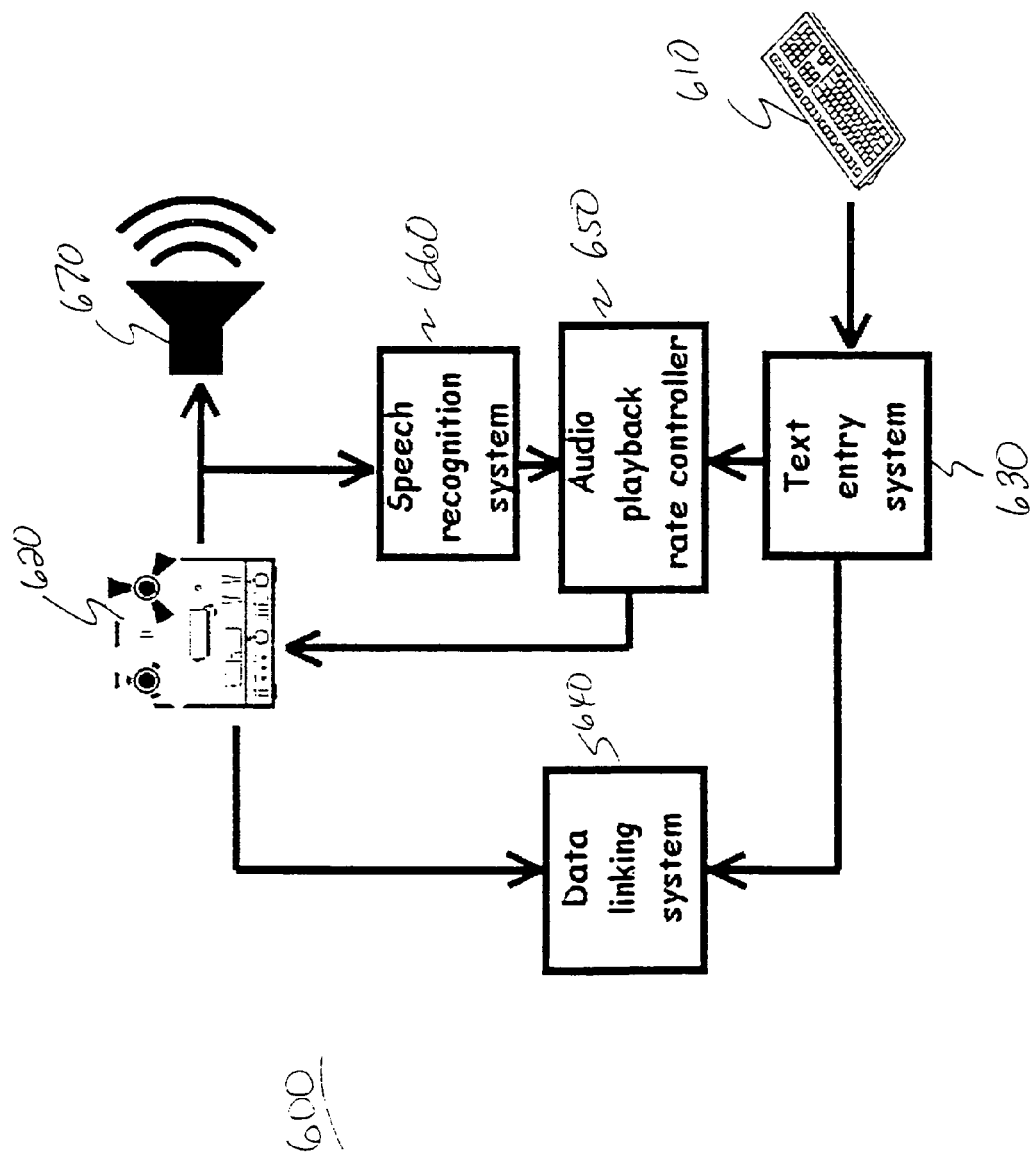
FIG. 5 is a recording system utilizing a rate controller to automatically control the speed of an audio data stream so that it is matches a streaming rate of a corresponding text-based input according to the principles of the present invention.

FIG. 5 is yet another exemplary recording system for closed caption generation according to the principles of the present invention.

Audio device 620 generates audio output at speaker 670 that is heard by user at keyboard 610. As sound such as words are played at speaker 670, corresponding text is generated at keyboard 610 and supplied to text entry system 630 such as a word processor.

In addition to driving speaker 670, the output of audio device 620 is fed into a speech recognition system 660. Audio playback rate controller 650 compares the present average text input rate of keyboard 610 with the present average speech output rate of speaker 670. If the average text input rate is faster than the average rate of words played by speaker 670, the audio playback rate controller increases the playback speed of the audio device. Conversely, the playback rate of the audio device is reduced when the audio playback rate controller senses that the average text input rate is slower that the average rate of words played by the speaker 670. In this way, the audio playback rate controller 650 automatically adjusts the playback rate to the present typing rate of user at keyboard 610. This alleviates the need for a transcriber to manually adjust the speed of an audio file as corresponding text is generated.

Data link 640 such as data stream correlator system as shown in FIG. 1 provides linking of data streams based on time-stamps generated by a common system clock. Audio device 620 generates an audio data stream that is correlated with a text-based data stream as previously described. In one embodiment, an event in audio data stream is optionally based upon a predetermined passage of time. Alternatively, events within audio data stream are defined by a passage of a predetermined amount of tape (analog recording) or a fixed number of audio samples (digital recording).

The principles of the present invention have applications beyond note taking, text entry, or a close captioning system. One example is a video surveillance system for an automobile parking lot. This example system uses multiple video cameras. One set of cameras record the automobiles and associated license plates at the entrance and exits. Another set of cameras record the parking area. In current video surveillance systems, cameras continuously record video on tape. This results in a waste of video recording media. A more efficient system would record, for example, only for a few seconds after a motion detector indicates when a car has entered or left the garage or parking space. This type of sporadic recording renders it difficult to determine where an event is recorded on a videotape. Even a time-stamped videotape must be searched for the appropriate time match.

The features of the present invention can be used to efficiently link the data from multiple video recorders. The events can be the start of video recording as triggered by the motion detectors and the data pointers would be the physical location (for example, a tape counter value) where the video recording starts. Our system links the video recording of cars and license plates entering and leaving the lot and the video recording of parking activity within the lot. For example, if a car hits another parked car and leaves without reporting the incident, the video recording of the parking lot activity can be quickly reviewed for all car activity next to the damaged car. Once suspect cars are identified in the parking lot video, time-stamped events and data pointers can be reviewed to link the video of these cars to the video recorded at the lot entrance and exits, so the car's license plates can be identified.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of correlating time sequenced data streams comprising computer implemented steps of:
   identifying events within a first data stream;
   generating positional information, also known as data pointers, for identified events;
   assigning a time-stamp to each event; and
   correlating data from the first data stream to data in a second data stream based on the time-stamped data pointers, wherein one of the first and second data streams includes audio data and has a playback rate dependent on detection of corresponding textual data in the other data stream.

2. A method as described in claim 1, wherein the time-stamps for events in the first data stream are generated by a system logger.

3. A method as described in claim 2, wherein the system logger time stamps data in the second data stream.

4. A computer method of correlating events in data streams comprising the steps of:
   detecting events within a first data stream and assigning corresponding data pointers to the events;
   detecting events within a second data stream and assigning corresponding data pointers to the events;
   utilizing the data pointers to link events in the first data stream to events in the second data stream; and
   assigning time-stamps to the events in the first data stream and in the second data stream to correlate events in the first data stream with events in the second data stream, wherein the time-stamps assigned to events in the first data stream and in the second data stream are generated from separate but synchronized clocks.

5. A method as described in claim 4 further comprising the steps of:
   identifying an event in the first data stream; and locating of a corresponding event in the second data stream using the time-stamps as an index.

6. A method as described in claim 4, wherein the time-stamps assigned to events in the first data stream are generated from a system clock.

7. A method as described in claim 4, wherein the first data stream is asynchronous.

8. A method as described in claim 4 further comprising the step of:
presenting the first data stream with a time-varying playback rate.

9. A method as described in claim 4, wherein an event in the first data stream is defined by a fixed passage of time.

10. A method as described in claim 4, wherein the first data stream includes data generated by a word processor and the second data stream includes audio data.

11. A method as described in claim 4 further comprising the step of:
varying a rate of generating the first data stream relative to the second data stream based on detection of events in the second data stream.

12. A method as described in claim 4, wherein the first data stream includes audio data and has a playback rate dependent on detection of corresponding textual data in the second data stream.

13. A method as described in claim 4, wherein the events in the first stream are random events.

14. A method as described in claim 4 further comprising additional data streams in which events are correlated.

15. A method as described in claim 4, wherein the first data stream and second data stream are recorded to a storage device for later retrieval and the corresponding data pointers indicate a location of a corresponding event recorded in the storage device.

16. Computer apparatus for correlating time sequenced data streams comprising:
an event detector for identifying events within a first data stream and generating positional information for the identified events; and
a system logger for assigning a time-stamp to identified events and correlating the time-stamped data in the first data stream with a second data stream, wherein the first data stream includes audio data and has a playback rate dependent on detection of corresponding textual data in the second data stream.

17. An apparatus as described in claim 16, wherein the time-stamp is generated by a system logger.

18. An apparatus as described in claim 17, wherein the system logger time-stamps data in the second data stream.

19. An apparatus for correlating events in data streams comprising:
a first event detector for identifying events within a first data stream;
a second event detector for identifying events within a second data stream; and
a system logger that generates data pointers to correlate an event in the first data stream to an event in the second data stream, wherein the system logger assigns time-stamps to the events in the first data stream and the second data stream, and the time-stamps assigned to the first data stream and second data stream are generated from separate but synchronized clocks.

20. An apparatus as described in claim 19, wherein the time-stamps are used as an index to approximate a location of an event in one data stream to an event in another data stream.

21. An apparatus as described in claim 19, wherein the time-stamps assigned to the first data stream are generated from a system clock.

22. An apparatus as described in claim 19, wherein the first data stream is asynchronous.

23. An apparatus as described in claim 19 further comprising:
a playback device that generates the first data stream and varies a rate of a prerecorded data stream.

24. An apparatus as described in claim 19, wherein an event in the first data stream is defined by a fixed passage of time.

25. An apparatus as described in claim 19, wherein the first data stream includes data generated by a word processor and the second data stream includes audio data.

26. An apparatus as described in claim 19 further comprising means for varying a rate of the first data stream relative to the second data stream based on detection of events in the second data stream.

27. An apparatus as described in claim 19, wherein the first data stream includes audio data and has a playback rate dependent on detection of corresponding textual data in the second data stream.

28. An apparatus as described in claim 19, wherein the events in the first stream are random events.

29. An apparatus as described in claim 19, wherein additional data streams are correlated to the first data stream.

30. An apparatus as described in claim 19, wherein the first data stream and second data stream are recorded to a storage device for later retrieval and the corresponding data pointers indicate a location of a corresponding event recorded in the storage device.

31. A computer implemented method of correlating events in data streams comprising the steps of:
detecting events within a first data stream and assigning corresponding data pointers to the events;
detecting events within a second data stream and assigning corresponding data pointers to the events; and
utilizing the data pointers to link events in the first data stream to events in the second data stream, wherein the first data stream includes audio data and has a playback rate dependent on detection of corresponding textual data in the second data stream.

32. Computer apparatus for correlating events in data streams comprising:
a first event detector for identifying events within a first data stream;
a second event detector for identifying events within a second data stream;
a system logger that generates data pointers to correlate an event in the first data stream to an event in the second data stream; and
means for varying a rate of the first data stream relative to the second data stream based on detection of events in the second data stream.

33. Computer apparatus for correlating events in data streams comprising:
a first event detector for identifying events within a first data stream;
a second event detector for identifying events within a second data stream; and
a system logger that generates data pointers to correlate an event in the first data stream to an event in the second data stream, wherein the first data stream includes audio data and has a playback rate dependent on detection of corresponding textual data in the second data stream.

* * * * *